United States Patent
Compeau

[11] 4,218,076
[45] Aug. 19, 1980

[54] PASSIVE SEAT BELT SYSTEM

[75] Inventor: Edward E. Compeau, Fraser, Mich.

[73] Assignee: General Motors Corporation, Detroit, Mich.

[21] Appl. No.: 24,107

[22] Filed: Mar. 26, 1979

[51] Int. Cl.$^2$ .............................................. B60R 21/02
[52] U.S. Cl. ................................... 280/804; 280/803; 280/807
[58] Field of Search ............... 280/802, 803, 804, 807, 280/808

[56] References Cited

U.S. PATENT DOCUMENTS

| | | | |
|---|---|---|---|
| 3,770,294 | 11/1973 | Hammer | 280/803 |
| 3,833,239 | 9/1974 | Coehen | 280/804 |
| 3,856,327 | 12/1974 | Otani | 280/803 |
| 3,889,971 | 6/1975 | Kazaoka et al. | 280/804 |
| 3,915,473 | 10/1975 | Lindblad | 280/804 |

*Primary Examiner*—John J. Love
*Assistant Examiner*—Donn McGiehan
*Attorney, Agent, or Firm*—Charles E. Leahy

[57] ABSTRACT

A passive seat belt system includes a shoulder belt having the outboard end mounted on body above the door opening by a shoulder belt retractor and a lap belt having an outboard end mounted on the lower rear corner of the door by a lap belt retractor. The inboard ends of the lap and shoulder belts are joined to the outboard end of the control belt whose other end is mounted inboard the seat by a control belt retractor having a winding effort greater than the lap and shoulder belt retractors to draw the lap and shoulder belts inboard to restraining positions about the occupant. A carriage movable along a track extending above the door opening slidably engages the shoulder belt and has a normal rearward position adjacent the shoulder belt retractor to establish the shoulder belt in a diagonal restraining position. The carriage is moved forwardly when the door is opened to stow a substantial length of the shoulder belt along the roof so that the inboard ends of the shoulder belt and lap belt are moved substantially upwardly and forwardly away from the seat as permitted by unwinding of control belt from the control belt retractor. The shoulder belt retractor has an associated locking mechanism which locks the retractor against unwinding of the shoulder belt to fix the length of the shoulder belt whenever the carriage is moved forwardly so that the forward movement of the carriage will unwind control belt from the control belt retractor instead of unwinding shoulder belt from the shoulder belt retractor.

3 Claims, 6 Drawing Figures

PASSIVE SEAT BELT SYSTEM

The invention relates to a passive occupant restraint system.

BACKGROUND OF THE INVENTION

It is well known to restrain an occupant in a seat by an automatically deployed shoulder belt extending diagonally across the upper torso and a lap belt extending across the lower torso.

U.S. Pat. No. 3,770,294, issued to Hammer, and assigned to the assignee of this invention, discloses a shoulder belt having the outboard end fixedly mounted on the vehicle roof adjacent the rear corner of the door and a lap belt having the outboard end mounted on the door by a retractor. The inboard ends of the lap and shoulder belts are joined to the outboard end of a control belt whose inboard end is mounted on the vehicle body inboard the seat by a control belt retractor having a winding effort greater than the lap belt retractor so that the juncture of the lap, shoulder and control belts is drawn inboard to establish the lap and shoulder belts in their respective restraining position about the occupant. The shoulder belt extends slidably through a carriage movable fore and aft along the roof rail above the door. The carriage has a normal rearward position adjacent the fixedly mounted end of the shoulder belt to establish the shoulder belt in the diagonal restraining position across the upper torso. When the door is opened, the shoulder belt carriage is moved forwardly to stow a substantial length of the shoulder belt along the roof rail above the door so that the inboard ends of the shoulder belt and lap belt are moved substantially upwardly and forwardly away from the seat as permitted by unwinding of the control belt from the control belt retractor. Simultaneously, the outward swinging movement of the door moves the outboard end of the lap belt outward and forward as permitted by unwinding of lap belt from the door mounted lap belt retractor.

It would be desirable for the shoulder belt of the Hammer type belt system to be mounted on the vehicle body by a retractor so that the length of the shoulder belt could be adjusted independently of movement of the lap belt and control belt to precisely fit the size of a particular occupant and facilitate forward leaning movement of the occupant within the seat. However, the forward movement of the belt carriage would tend to unwind shoulder belt from the shoulder belt retractor instead of unwinding control belt from the control belt retractor as required to obtain the desired substantial upward and forward movement of the inboard ends of the lap and shoulder belt.

SUMMARY OF THE INVENTION

The present invention provides an improvement in the passive restraint of Hammer. More particularly, the present invention provides for the mounting of the outboard shoulder belt end by a retractor having a retracting effort lesser than the retracting effort of the control belt retractor so that when the belt is in the use position the length of the shoulder belt is freely adjustable to fit the size of a particular occupant and permit forward leaning movement of the occupant to reach the vehicle controls. The invention also provides a locking mechanism for the shoulder belt retractor to fix the length of shoulder belt whenever the carriage is moved forwardly so that the forward movement of the carriage will unwind the control belt from the control belt retractor instead of unwinding shoulder belt from the shoulder belt retractor.

These and other objects, features and advantages of the invention will become apparent upon consideration of the specification and the appended drawings in which.

DESCRIPTION OF THE PREFERRED EMBODIMENT

Figure 1:
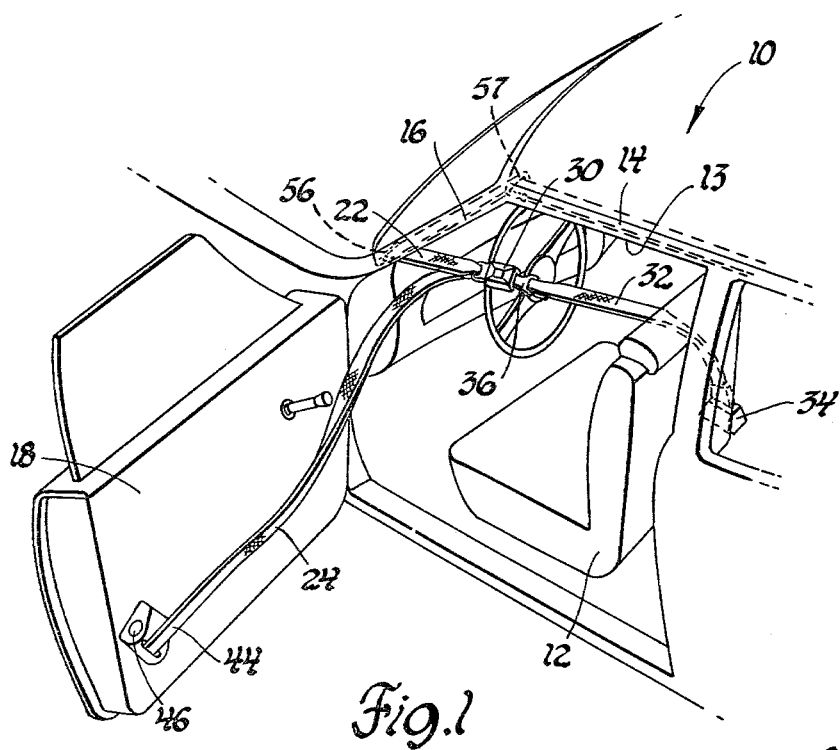
FIG. 1 is a perspective view of the vehicle body having the passive occupant restraint according to the invention shown in the occupant access position when the door is open.

Referring to FIG. 1, there is shown a vehicle body 10 having a seat 12 located laterally adjacent a door opening 13 defined in part by a longitudinally extending roof rail 14 and an angularly inclined windshield pillar 16. A door 18 is hingedly mounted on the vehicle body 10 for swinging movement between an open position shown in FIG. 1 and a closed position shown in FIG. 2.

A passive occupant restraint system for restraining an occupant in the seat 12 includes a shoulder belt 22 and a lap belt 24. The shoulder belt 22 and lap belt 24 have respective inboard ends 26 and 28 which are joined together by attachment to the housing of an emergency disconnect buckle 30. A control belt 32 is retractably mounted by an inboard control belt retractor 34 suitably mounted on the vehicle body inboard the occupant seating position. The control belt 32 carries a conventional latch plate 36 which couples with the buckle 30.

Figure 2:
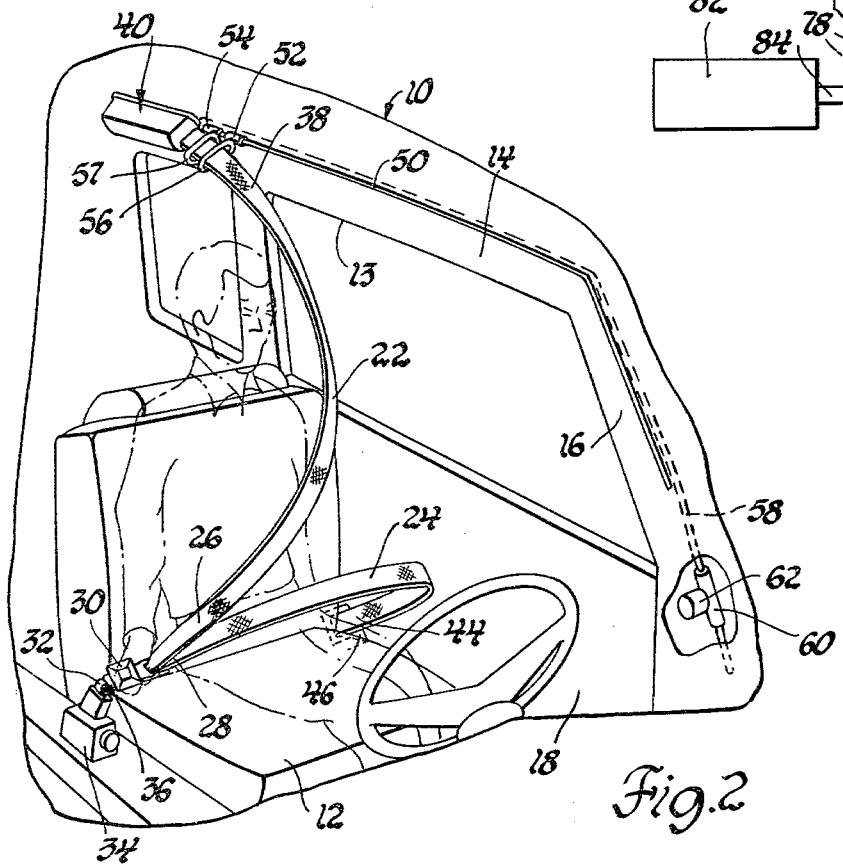
FIG. 2 is a perspective view of the vehicle body showing the passive occupant restraint system of the invention in the normal restraining position when the door is closed.

As best seen in FIG. 2, the shoulder belt 22 has an outboard end 38 which is attached to the roof rail 14 generally above and behind the door opening by a shoulder belt retractor 40. The lap belt 24 has an outboard end 44 which is retractably mounted on the lower rear corner of the door 18 generally adjacent the hip of the occupant by a lap belt retractor 46. Each of the retractors 34, 40 and 46 have an inertia sensor or other suitable prior art mechanism to selectively lock the respective belts against unwinding when an emergency condition is encountered or when the vehicle is in use. The locking mechanism of the lap belt retractor 46 may also be of the type connected to the door handle as in Arlauskas et al. U.S. Pat. No. 3,692,328.

As best seen in FIG. 2, a track 50 extends longitudinally along the roof rail 14 and part way down the windshield pillar 16. A forward carriage 52 and a rearward carriage 54 are movable along the track 50 and include guide loops 56 and 57 which slidably receive the shoulder belt 22 intermediate the shoulder belt retractor 40 and the buckle 30. When the carriages 52 and 54 are located at their rearwardmost positions of FIG. 2, the shoulder belt 22 assumes the normal occupant restraining position extending diagonally over the outboard shoulder and across the upper torso of the occupant.

Referring to FIG. 2, it will be understood that the inboard control belt retractor 34 has a winding effort greater than the winding effort of the shoulder belt retractor 40 and the lap belt retractor 46 so that shoulder belt 22 and lap belt 24 are unwound from their retractors to locate the buckle 30 and inboard belt ends 26 and 28 generally adjacent the control belt retractor and the inboard occupant hip so that the lap and shoulder belts are established in their normal restraining position of FIG. 2. Accordingly, the lengths of the shoulder belt 22 and lap belt 24 are adjusted by their respective retractors 40 and 46 to fit the size and seating position of the particular seated occupant without unwinding the control belt 32 from the control belt retractor 34.

A suitable drive mechanism is associated with the track 50 and carriages 52 and 54 to move the carriages fore and aft along the track 50. In general, according to the preferred embodiment of the invention, the drive mechanism includes a drive cable 58 which is moved longitudinally through the track 50 by a drive unit 60 having an electric motor 62. The forward carriage 52 is attached directly to the drive cable 58 so that longitudinal movement of the drive cable 58 by the drive unit 60 moves the forward carriage 52 forwardly from the FIG. 2 position along the roof rail 14 and down the windshield pillar 16 to the forward position of FIG. 1. The drive cable 58 is slidable through the rear carriage 54 so that the initial forward travel of the drive cable 58 allows the rear carriage 54 to remain parked at its rearward position of FIG. 2 until a drive member, not shown, attached to the drive cable 58 engages the rear carriage 54 and pushes it forwardly to the FIG. 1 position at the juncture of the roof rail 14 and the windshield pillar 16. Referring to FIG. 1, the drive cable 58 and drive unit 60 establish the carriages 52 and 54 in their respective forward positions of FIG. 1 when the door is opened so that the shoulder belt 22 assumes a stowed position in generally parallel relationship with the roof rail 14 and the windshield pillar 16. When the door is closed the drive unit 60 moves the drive cable 58 rearwardly to reestablish the shoulder belt carriages 52 and 54 at the rearward position of FIG. 2 so that the shoulder belt is established in the normal diagonal restraining position of FIG. 2.

Figure 4:
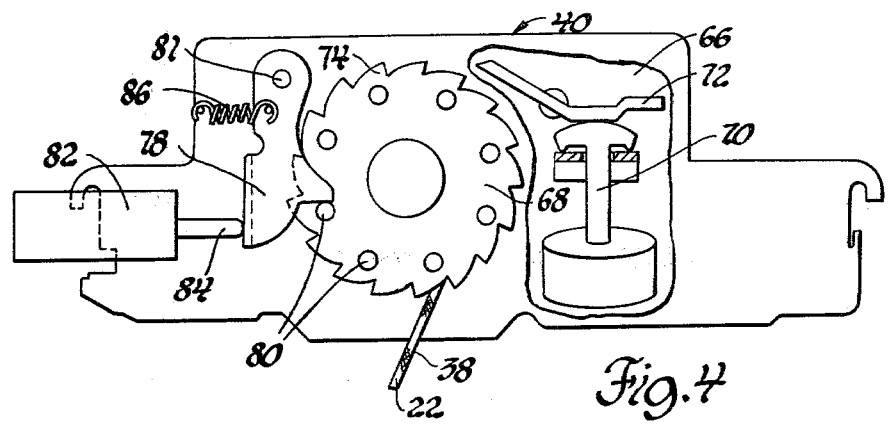

Referring to FIG. 4, it is seen that the shoulder belt retractor 40 includes a housing 66 which rotatably mounts a belt reel 68 to which the outboard end 38 of the shoulder belt 22 is attached. The retractor 40 has a winding spring, not shown, which rotates the reel 68 in the counter clockwise direction as viewed in FIG. 4 to wind the shoulder belt 22 on the reel 68. The shoulder belt retractor 40 also has an inertia actuated locking mechanism including an inertia sensing pendulum 70 which moves a lock bar 72 into locking engagement of one of a plurality of ratchet teeth 74 carried by the reel 68 when the vehicle experiences a predeterminal level of acceleration.

Figure 3:
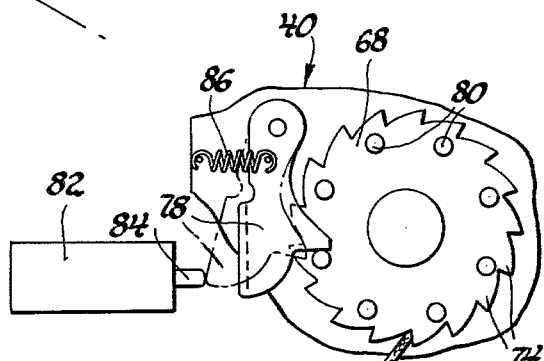
FIGS. 3 and 4 show the shoulder belt retractor and the locking mechanism for selectively locking the shoulder belt against unwinding during movement of the belt from the position of FIG. 2 to the position of FIG. 1.

The retractor 40 also has a locking mechanism including a pawl 78 which is engageable with one of a plurality of locking pins 80 which project laterally from the face of the reel 68. The pawl 78 is pivotally mounted on the housing 66 by a pivot 81. An electrical solenoid 82 has a plunger 84 which is extended upon energization of the solenoid 82 to pivot the pawl 78 to the locking position of FIG. 4 against the bias of a relatively light tension spring 86 acting between the pawl 78 and the housing 66. Referring to FIG. 3, it is seen that as long as some tension is maintained on the shoulder belt 22 the pawl 78 will remain in engagement with the locking pin 80 to prevent belt unwinding even after the solenoid plunger 84 is withdrawn. However, when the tension is relieved from the shoulder belt 22, the winding spring will initiate winding rotation of the reel 68 in a counter clockwise direction so that the pin 80 is moved out of engagement with the pawl 78 permitting the tension spring 86 to pivot the pawl 78 clockwise to the phantom line indicated position of FIG. 3 to unlock the reel 68 for a subsequent unwinding of the belt.

Figure 5:
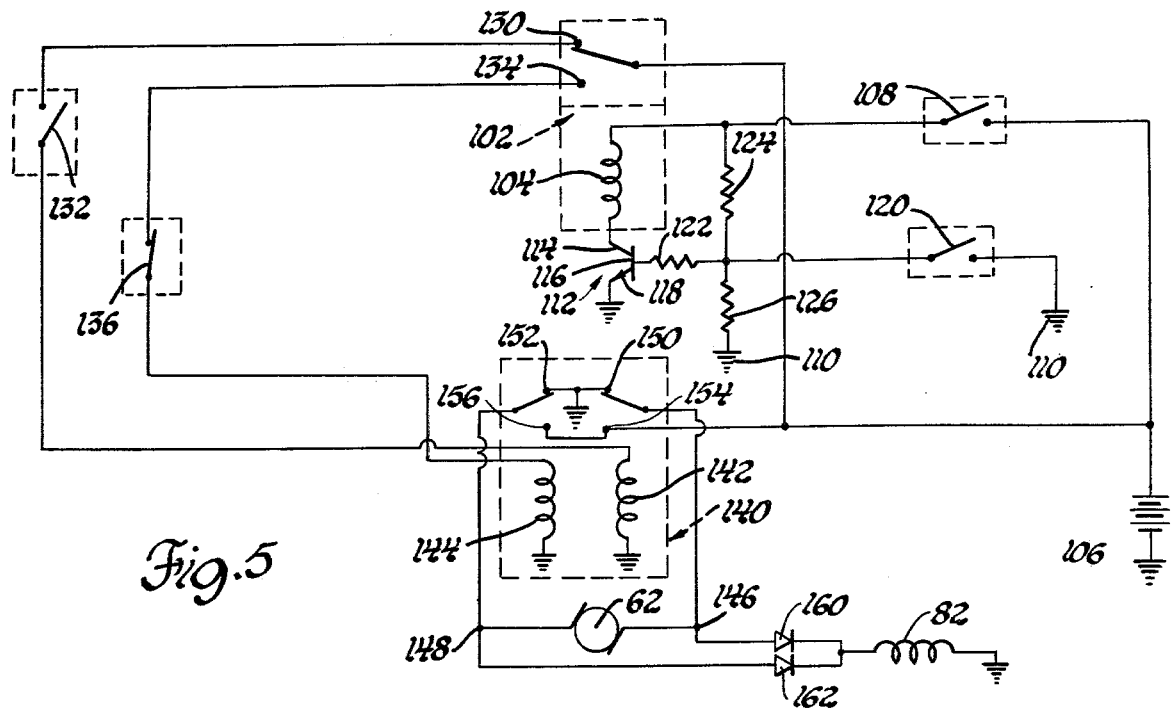
FIGS. 5 and 6 show electrical circuits for controlling the locking mechanism of the shoulder belt retractor for the driver seat belt system and the passenger seat belt system.

Referring to FIG. 5, a control circuit for operating the drive motor 62 and retractor solenoid 82 of the driver's passive seat belt system is shown. The circuit includes a relay 102 having a solenoid coil 104 which receives power from a power source 106 connected through the vehicle ignition switch 108. The other side of solenoid coil 104 is connected to a ground 110 through a transistor 112 having a collector 114, base 116 and emitter 118. The base 116 of transistor 112 is connected to a door switch 120 by a resistor 122. The door switch 120 is closed when the door is open. The resistor 122 is connected to the ignition switch 108 by a resistor 124 and to ground 110 by a resistor 126. Whenever the ignition switch 108 is closed, and the door switch 120 is opened by closing the door, power source 106 is connected through the resistors 124 and 122 to the base 116 of transistor 112 so that the ground side of the solenoid coil 104 is connected to ground 110 to energize the solenoid coil 104. However, if the door switch 120 is closed by opening the door when the ignition switch is closed, the current flow to the resistor 122 and transistor base 116 is conducted through the door switch to the ground so that the transistor 112 is turned off and the solenoid coil 104 is deenergized. Likewise, if the ignition switch 108 is turned off, the solenoid coil 104 will be deenergized.

The relay 102 has a contact 130 connected to a forward limit switch 132 and a contact 134 connected to a rearward limit switch 136. The forward limit switch 132 is open when the carriage reaches its forward position and is closed at all other times. The rearward limit switch 136 is open when the carriage reaches the full rearward position and is closed at all other times. Accordingly, FIG. 5 shows the limit switches 132 and 136 in their respective positions indicating that the carriage is at the full forward position of FIG. 1.

The circuit also includes a relay 140 for control of the drive motor 62 and the retractor solenoid 82. The relay 140 has a relay coil 142 having one side grounded and the other side connected to the forward limit switch 132. The relay 140 also has a solenoid coil 144 having one side grounded and the other side connected to the rearward limit switch 136. When the relay coils 142 and 144 are deenergized, the terminals 146 and 148 of the drive motor 62 are respectively connected to grounded contacts 150 and 152 of the relay 140. When coil 142 is energized the motor terminal 146 is connected with a relay contact 154 which is in turn connected to the power source 106 so that the motor is energized and rotates in the direction to move the carriages 52 and 54 forwardly along the track 50. On the other hand, when the relay coil 144 is energized, the motor terminal 148 is connected to the relay contact 156 which is also connected to the power source 106 so that the motor is rotated in the other direction to move the carriages 52 and 54 rearwardly. The solenoid 82 associated with the shoulder belt retractor 40 has one side connected to ground and the other side connected respectively to the motor terminals 146 and 148 by diodes 160 and 162. Accordingly, when the motor is energized in either direction of rotation, the retractor solenoid 82 is also energized to the extended position of FIG. 4 to lock the shoulder belt retractor 40 against unwinding of the shoulder belt 22.

OPERATION

Referring to FIG. 5, it will be understood that when the vehicle is unoccupied, the door switch 120 is open and the ignition switch 108 is off. Accordingly, the coil 104 of relay 102 is deenergized and the relay contact 130 is connected with power source 106 so that there is current to the forward limit switch 132. Since the forward limit switch 132 is closed at all times except when the carriages 52 and 54 are fully forward, the relay coil 142 will have been previously energized to connect motor terminal 146 with the power source 106 through the relay contact 154 so that the motor 62 will have driven the carriages forward to open the forward limit switch 132 and deenergize the motor 62. During any such energization of the motor to move the carriages forwardly, the retractor solenoid 82 will be energized to extend the solenoid plunger 84 as shown in FIG. 4 to establish the locking pawl 78 in locking engagement with one of the pins 80 of the reel 68. Accordingly, during the forward motion of the carriages 52 and 54 the shoulder belt 22 is locked against unwinding from the reel 68. Furthermore, upon interruption of the current to the motor 62 and solenoid 82 caused by opening of the forward limit switch 132, the tension remaining upon the shoulder belt 22 by the winding effort of the control belt retractor 34 will cause the pin 80 of the reel to remain in engagement with the pawl 78 so that the reel 68 remains locked against unwinding as shown in FIG. 3 even though the solenoid plunger 84 is retracted. Thus, whenever the vehicle is unoccupied the carriages 52 and 54 are parked at their forward positions of FIG. 1 and the inboard ends of the lap and shoulder belt are located substantially upward and forwardly of the seat in readiness for entry of the occupant. The pawl 78 locks the shoulder belt retractor 40 so that the greater retracting effort of the control belt retractor 34 cannot unwind the shoulder belt.

Referring again to FIG. 1, it is seen that when the vehicle door is opened, the outward swinging movement of the door moves the lap belt retractor 46 substantially outward to move the outboard portion of the lap belt 24 to the occupant access position of FIG. 1. When the door is closed, the door switch 120 opens and the lap belt is wound by the lap belt retractor 46. When the ignition switch 108 is closed, the relays 102 and 140 function to connect the power source 106 with the motor terminal 148 so that motor 62 is energized to move the carriages 52 and 54 rearwardly. The roof retractor solenoid 82 is simultaneously energized to retain the pawl 78 in engagement of the pin 80 as seen in FIG. 4 to assure that the shoulder belt 22 slides through the carriages 52 and 54 instead of being wound by the retractor 40. Thus the control belt retractor 45 winds the control belt 32 to draw the inboard ends of the lap and shoulder belts inboard to establish the belts in their restraining positions of FIG. 2.

When the carriages 52 and 54 reach their full rearward positions, the rearward limit switch 136 is opened to interrupt current flow to relay 140 so that the motor terminal 148 is again grounded. The roof retractor solenoid 82 is simultaneously deenergized so that a subsequent slight rewinding of the shoulder belt 22 disengages the pin 80 from contact with the pawl 78 and permits the spring 86 to rotate pawl 78 to the phantom line position of FIG. 3. Thus the shoulder belt retractor 40 is restored to winding and unwinding of the shoulder belt 22 to fit the size of the occupant and permit the occupant to move about in the seat.

If the door switch 120 is closed by opening the door 18 or if the ignition switch 108 is turned off at any time while the carriages 52 and 54 are still travelling rearwardly or after the carriages have reached the full rearward position, the relay 102 is deenergized and restores the connection between power source 106 and the relay 140 through the forward limit switch 132 which is closed because the carriages are not full forward. Energization of the coil 142 of relay 140 connects the motor terminal 146 with the power source 106 so that the motor 62 is energized in the direction to move the carriages 52 and 54 forwardly along the track 50. Simultaneously, the roof retractor solenoid 82 is energized to move the pawl 78 into engagement with the pin 80 to lock the reel 68 against belt unwinding rotation. The locking of the shoulder belt retractor assures that forward movement of the carriages 52 and 54 stows the shoulder belt 22 along the roof rail 14 to move the inboard ends of the lap and shoulder belts upwardly and forwardly to the position of FIG. 1 instead of unwinding shoulder belt 22 from retractor 40. When the carriages 52 and 54 reach the full forward position, the forward limit switch 132 is opened to deenergize the coil 142 of relay 140 and in turn ground the motor terminal 146 to stop the motor 62. The retractor coil 82 is simultaneously deenergized but the unwinding tension provided on the shoulder belt 22 by the winding effort of the control belt retractor 34 holds the pin 80 and pawl 78 in the locking position of FIG. 3 so that the larger effort of the control belt retractor 34 cannot unwind the shoulder belt 22 from the shoulder belt retractor 40.

Figure 6:
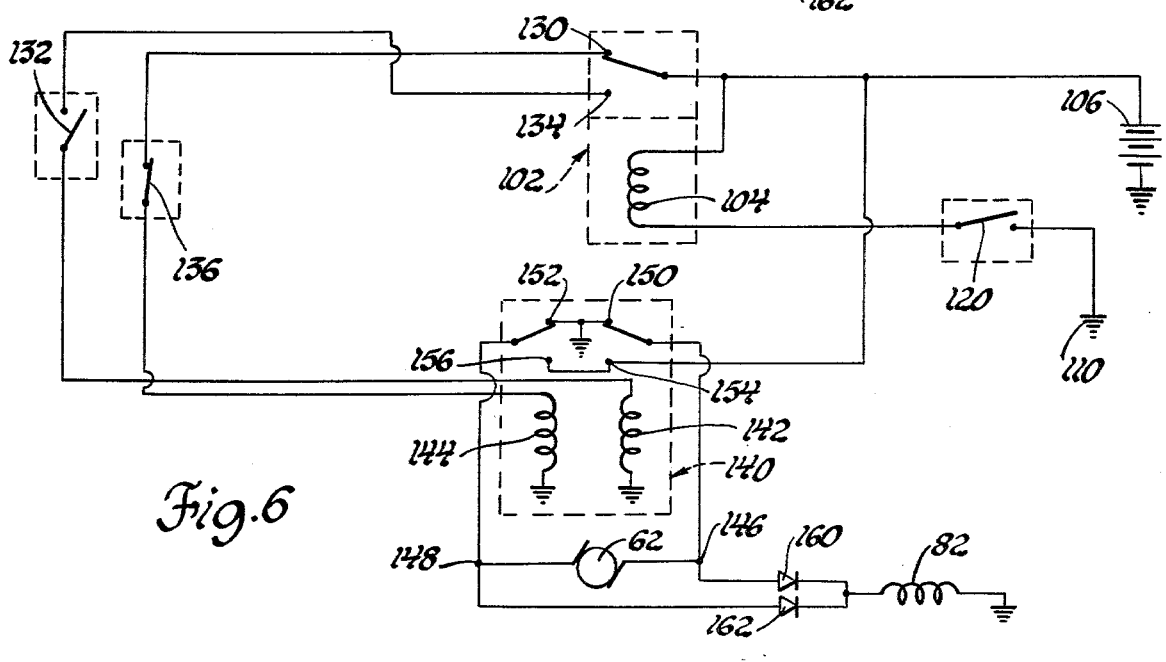

Referring to FIG. 6 there is shown a control circuit for the passenger passive seat belt. The circuit of FIG. 6 has like elements identified by the same reference numerals as FIG. 5 and differs chiefly in that there is no connection to the ignition switch. In the control circuit of FIG. 6, the forward limit switch 132 is open when the carriages reach the forward position and is closed at all other times. The rearward limit switch 136 is open when the carriages reach the rearward position and is closed at all other times. Accordingly, FIG. 6 shows the limit switches 132 and 136 in their respective positions indicating that the carriages are at the full rearward position of FIG. 2. When the occupant opens the door 18, the door switch 120 closes to energize the relay 102 so that the relay contact 134 connects the power source 106 with the relay 140 through the closed forward limit switch 132. This in turn energizes the coil 142 of relay 140 so that the contact 154 connects the power source 106 with the motor terminal 146 and energizes motor 62 in the direction to move the carriages 52 and 54 forwardly to their positions of FIG. 1. The solenoid coil 82 of the shoulder belt retractor 40 associated with the passenger seat belt system is simultaneously energized to engage the lock pawl 78 with the reel 68 so that the forward movement of the carriages 52 and 54 does not unwind shoulder belt from the shoulder belt retractor.

When the occupant enters the car and closes the door, the door switch 120 is opened so that the relay 120 is deenergized and the power source 106 connected through the contact 130 with the rearward limit switch. Since the rearward limit switch 136 is closed at all times except when the carriages are fully rearward, current will be conducted to the relay coil 144 causing the power source 106 to be connected through the relay contact 156 to the motor terminal 148 to energize motor 62 in the direction to move the carriages rearwardly. During rearward movement of the carriages, the solenoid coil 82 is energized to hold the pawl 78 in locking engagement of the reel 68 so that the shoulder belt 22 is not wound upon the shoulder belt retractor 40. When the carriages reach the forward position, the rearward limit switch 136 is opened so that the motor 62 is deenergized and coil 82 is deenergized.

Thus, it is seen that the control circuit of FIG. 6 for the passengers seat belt system differs chiefly from that of FIG. 5 for the drivers seat belt system in that the carriages park at the rearward position of FIG. 2 when the door is closed instead of in the forward position of FIG. 1.

While this invention has been disclosed primarily in terms of the specific embodiment shown in the drawings, it is not intended to be limited thereto but rather only to the extent set forth in the appended claims. For example, while the drawings show a pair of shoulder belt carriages 52 and 54, the invention may be advantageously employed in systems where there is only a single carriage which stops at the front end of the roof rail. Furthermore, while the lock pawl 78 of the shoulder belt retractor 40 is shown herein as operated by an electric circuit, it is within the scope of the invention to operate the pawl by a plunger or the like mechanically interconnected with the door or mechanically interconnected with the shoulder belt carriage.

The embodiments of the invention in which an exclusive property or privilege is claimed are defined as follows:

1. In combination with a vehicle body having an occupant compartment in which an occupant seat is accessible through a door opening selectively opened and closed by a movable door, a passive occupant restraint belt arrangement comprising:
   a lap belt having an outboard end mounted on the lower rear portion of the door and an inboard end;
   a shoulder belt having an outboard end and an inboard end;
   a shoulder belt retractor mounting the outboard shoulder belt end on the vehicle body generally adjacent the upper rear portion of the door for extending and retracting movement;
   a control belt attached to the inboard ends of the lap belt and shoulder belt and having an inboard end;
   a control belt retractor mounting the inboard control belt end inboard the occupant seat and having a retracting effort relatively greater than the retracting effort of the shoulder belt retractor so that the shoulder belt is extended from the retractor and the lap and shoulder belts are established in restraining positions closely adjacent the occupant;
   a carriage slidably engaging the shoulder belt and movable along the body above the door opening between a rearward position adjacent the shoulder belt retractor to dispose the shoulder belt in restraining position across the occupant and a forward position;
   means for selectively moving the carriage forwardly along the track to the forward position;
   and means for locking the shoulder belt retractor to prevent shoulder belt extension and fix the shoulder belt length when the carriage is moved forward of the shoulder belt retractor whereby forward carriage movement stows shoulder belt above the door opening and extends the control belt from the inboard retractor to lift the inboard lap and shoulder belt ends upwardly and forwardly to facilitate occupant ingress and egress and rearward carriage movement allows retraction of control belt by the control belt retractor to lower the lap and shoulder belts to the restraining positions.

2. In combination with a vehicle body having an occupant compartment in which an occupant seat is accessible through a door opening defined in part by a roof rail and being selectively opened and closed by a movable door, a passive occupant restraint belt arrangement comprising:
   a lap belt having an outboard end and an inboard end;
   a lap belt retractor mounting the outboard lap belt end on the door for extending and retracting movement;
   a shoulder belt having an outboard end and an inboard end;
   a shoulder belt retractor mounting the outboard shoulder belt end on the roof rail for extending and retracting movement;
   a control belt having an outboard end attached to the inboard ends of the lap belt and shoulder belt and having an inboard end;
   a control belt retractor mounting the inboard control belt end inboard the occupant seat and having a retracting effort relatively greater than the retracting effort of the lap and shoulder belt retractors so that the lap and shoulder belts are extended from their respective retractors to restraining positions closely adjacent the occupant;
   a track mounted on the roof rail and extending forwardly from the shoulder belt retractor;
   a carriage movable along the track and slidably engaging the shoulder belt;
   means normally establishing the carriage adjacent the shoulder belt retractor and selectively moving the carriage forwardly along the track;
   and means for locking the shoulder belt retractor to prevent shoulder belt extension and fix the shoulder belt length when the carriage is moved forward of the shoulder belt retractor whereby the forward movement of the carriage disposes the fixed length of shoulder belt along the roof rail and extends the control belt from the inboard retractor to lift the inboard lap belt end upwardly and forwardly and thereby facilitate occupant ingress and egress.

3. In combination with a vehicle body having an occupant compartment in which an occupant seat is accessible through a door opening defined in part by a roof rail and being selectively opened and closed by a movable door, a passive occupant restraint belt arrangement comprising:
   a lap belt having an outboard end and an inboard end;
   a lap belt retractor mounting the outboard lap belt end on the door for extending and retracting movement;
   a shoulder belt having an outboard end and an inboard end;

a shoulder belt retractor mounting the outboard shoulder belt end on the roof rail for extending and retracting movement;

a control belt having an outboard end attached to the inboard ends of the lap belt and shoulder belt and having an inboard end;

and a control belt retractor mounting the inboard control belt end inboard the occupant seat and having a retracting effort relatively greater than the retracting effort of the lap and shoulder belt retractors so that the lap and shoulder belts are extended from their respective retractors to restraining positions closely adjacent the occupant;

a track mounted on the roof rail and extending forwardly from the shoulder belt retractor;

a carriage movable along the track and slidably engaging the shoulder belt, said carriage having a normal rearward position adjacent the shoulder belt retractor permitting the lap and shoulder belts to assume their restraining positions;

electric motor operated drive means for selectively moving the carriage along the track forwardly of the shoulder belt retractor;

and electrical solenoid locking means for locking the shoulder belt retractor to prevent shoulder belt extension and fix the shoulder belt length whenever the carriage is located forwardly of the shoulder belt retractor whereby the forward movement of the carriage disposes the fixed length of shoulder belt along the roof rail and extends the control belt from the inboard retractor to lift the inboard lap and shoulder belt ends upwardly and forwardly and thereby facilitate occupant ingress and egress.

* * * * *